United States Patent [19]

Murphy et al.

[11] 4,281,712
[45] Aug. 4, 1981

[54] MINIMIZING CLAY AND SHALE DAMAGE IN A LOG-INJECT-LOG PROCEDURE

[75] Inventors: Robert P. Murphy, Bixby; Frank O. Jones, Jr., Tulsa, both of Okla.

[73] Assignee: Standard Oil Company (Indiana), Chicago, Ill.

[21] Appl. No.: 159,254

[22] Filed: Jun. 13, 1980

[51] Int. Cl.$^3$ .................. E21B 47/00; E21B 49/00
[52] U.S. Cl. ........................ 166/250; 73/152; 250/259
[58] Field of Search ............. 166/250, 252; 73/151, 73/152; 260/259

[56] References Cited

U.S. PATENT DOCUMENTS

| | | | |
|---|---|---|---|
| 3,631,245 | 12/1971 | Jorden, Jr. et al. | 250/259 |
| 3,748,474 | 7/1973 | Murphy | 250/259 |
| 3,783,683 | 1/1974 | Murphy et al. | 73/152 |
| 4,173,718 | 11/1979 | Fertl | 250/259 |
| 4,191,883 | 3/1980 | Albright et al. | 250/259 |

*Primary Examiner*—Stephen J. Novosad
*Assistant Examiner*—George A. Suchfield
*Attorney, Agent, or Firm*—Donald L. Traut; Fred E. Hook

[57] ABSTRACT

This invention relates to a method of determining oil saturation in an underground rock formation penetrated by a wellbore by use of a log-inject-log technique. In such techniques, thermal neutron decay time logs are taken with the formation in the native state and then again after fresh water has been injected into the formation. These logs determine water saturations which are used to determine oil saturation. The method of this invention is directed to a method to prepare an aqueous salt solution so that clay and shale impairment of the formation is prevented but such that the thermal neutron capture cross section of the injected fresh water is not significantly different from that of the fresh water typically used.

9 Claims, No Drawings

MINIMIZING CLAY AND SHALE DAMAGE IN A LOG-INJECT-LOG PROCEDURE

BACKGROUND OF THE INVENTION

1. Field of the Invention

This invention relates to a method of logging a subsurface formation penetrated by a wellbore to determine oil saturation. In particular, this invention relates to a method by which clay and shale damage is minimized in a log-inject-log procedure of determining oil saturation.

2. Setting of the Invention

In the planning or engineering of the production of oil from an underground formation, it is important to know the amount of oil in place. Oil in underground reservoirs is contained in the pores of the rock. However, these pores also contain, in addition to oil, water and frequently gas.

There are several ways to determine the percent of rock volume which is porous space. One such way is to cut a core, which typically is a cylindrical piece of the rock which is 2 to 3 inches in diameter and usually 20 to 30 ft. in length. After recovery of the core to the surface its porosity is determined. However, knowledge of the porosity of the rock does not give a complete knowledge of the amount of oil in the rock. One must still determine what part of the core pore space is filled with water, what part with oil and what part with gas. One can measure the quantities of gas, oil and water in the core that has been brought to the surface and determine the water, oil and gas saturations in the core. However, experience shows that the fluid content of the core at the surface is seldom the same as was the fluid content of the core in its natural condition in the reservoir.

Therefore, the formation preferably be analyzed in situ for oil saturation. However, the only logging device available that is described as having the capability to measure formation oil saturation directly is a carbon oxygen log which does not attain sufficient accuracy for measurement of oil saturation. Formation oil saturation means that percent of the fluid in the pore space of the reservoir rock, which is oil. There are devices, however, which can provide a measure of the water saturation. If a gas saturation exists, it can be measured by an independent method such as described in U.S. Pat. No. 3,282,095. Oil saturation can then be computed as the percent of pore space of the rock that is not filled by water or gas.

Pulsed neutron logs used in a log-inject-log sequence can be used to determine water saturations in wells which are cased or that are completed open hole. Usual procedure is to log a well in its true or native state and again after injecting a fresh water having a thermal neutron capture cross section nearly equal to that of formation hydrocarbons. This is called a log-injectlog procedure. An equation used to compute the formation oil saturation from this log-inject-log procedure assuming that no gas saturation exists, is $$So = 1 - [(\Sigma_t - \Sigma_{ff})/\phi(\Sigma_w - \Sigma_{hc})]$$

wherein $\Sigma_t$ = thermal neutron capture cross section of the formation as measured by the pulsed neutron log prior to injecting the freshwater.

$\Sigma_w$ = thermal neutron capture cross section of the formation water and can be predicted from chemical analysis of the formation water.

$\Sigma_{ff}$ = the thermal neutron capture cross section of the formation as measured by the pulsed neutron log after injecting fresh water to miscibly displace all of the formation water plus some of the formation oil. The thermal neutron capture cross section of the fresh water is adjected to be approximately equal to that of the formation hydrocarbon.

$\Sigma_{hc}$ = thermal neutron capture cross section of the formation hydrocarbons and can be estimated from compositional analysis of the oil at reservoir conditions.

$\phi$ = the porosity, fraction of bulk volumes which is determined from core data and/or porosity log.

In such a logging technique where fresh water must be injected so as to have a fluid in the pore space with a proper thermal neutron capture cross section, several problems can occur with the clay and shale usually present in the formation. The clays in these formations are sometimes peptized or dispersed by the fresh water thereby causing permanent impairment of the formation. Further, shale may be caused to slough into the hole which also impairs the flow in and out of the formation. In such impairments, fluids will not flow as readily into or out of the formation as it would prior to injection of the fresh water.

3. Relevant Publication

U.S. Pat. No. 3,783,683, Robert P. Murphy et al., issued on Jan. 8, 1974, and entitled "Minimizing Clay Damage in a Log-Inject-Log Procedure" discloses a procedure by which the fresh water is treated to prevent clay impairment while maintaining a neutron capture cross section of the solution similar to that of fresh water which it replaces. The method includes the use of a divalent metallic salt solution whose cation has a thermal neutron capture cross section less than $0.6 \times 10^{-24}$ cm$^2$ and whose anions has no constituents having a thermal neutron capture cross section more than $0.6 \times 10^{-24}$ cm$^2$, the salt generating essentially a neutral pH upon dissolving in water and being at least 3000 ppm in the solution. Murphy preferred magnesium sulfate as the divalent metallic salt.

U.S. Pat. No. 4,142,595, Duane B. Anderson and Carl D. Edwards, issued Mar. 6, 1979 and entitled "Shale Stabilizing Drilling Fluid" discloses a drilling fluid which includes a salt having cation of either potassium or ammonium and having a concentration of 100,000 ppm in addition to flax seed gum and a non clay viscosifier. The preferred salts of Anderson include potassium chloride and ammonium sulfate. The drilling fluid of Anderson would not be suitable for injection into a formation as required in this invention.

SUMMARY OF THE INVENTION

In logging a subsurface formation or zone in which it is required that fresh water be injected into the formation or zone, a method of minimizing damage in such a subsurface formation or zone comprises injecting an aqueous salt solution into the formation, the salt comprising at least 1000 ppm of the solution and whose cation is selected from the group consisting of potassium and ammonium and whose anion has no constituents having a thermal neutron capture cross section more than $0.6 \times 10^{-24}$ cm$^2$.

Additionally, this invention includes a method wherein the clay and shale damage is minimized during logging of a subsurface formation or zone having the steps of injecting an aqueous potassium chloride solution into the formation or zone, the salt being at least 100,000 ppm of the solution, running a thermal neutron decay time log, injecting a second aqueous solution into the formation or zone, the salt being at least 1000 ppm, whose cation is selected from a group consisting of potassium and ammonia and whose anion has no constituents having a thermal neutron capture cross section more than about $0.6 \times 10^{-24}$ cm$^2$ and running a thermal neutron decay time log.

The method of this invention provides a water soluble monovalent cation salt solution which has a thermal neutron capture cross section for the solution similar to fresh water.

Further, the method of this invention provides a fresh water replacement which is compatible with the formation and also minimizes the clay and shale damage.

Still further, this invention provides a monovalent cation chloride salt solution which is a replacement for the sodium chloride salt solution typically injected to replace waterflood fluid of unknown salinity.

In addition, the method of the invention provides a monovalent cation chloride salt solution to replace waterflood salt water solution which is compatible with the formation and minimizes the clay and shale damage.

Further still, the invention provides other advantages which will become evident in the description to follow.

DETAILED DESCRIPTION OF THE INVENTION

Although the invention can be used in any logging process where it is desirable to inject fresh water followed by the running of a pulsed neutron log. A complete logging process will be described in connection with Equation 1. The term $\Sigma_t$ and $\Sigma_{ff}$ must be found by logging techniques since the rest of the terms of Equation 1 can be estimated or found by using independent methods.

Step I: The well is conditioned to produce as near as possible the same gas, oil and water saturation adjacent to the wellbore as that present in the rock formation remote from the wellbore. All well logging techniques currently known measure physical properties of the rock formations and their fluid contents immediately adjacent to the wellbore. It is well known that the relative content of gas, oil and formation water which is a considerable distance from the wellbore is frequently quite different from that near the wellbore. Thus, before commencing the logging operation, it is desirable to restore the formation to a steady state condition.

The formation adjacent to the wellbore is therefore conditioned by controlled production usually consisting of a very slow rate of production so that there is a small pressure drop between the wellbore and the formation remote from the well. This permits the liquid present in the reservoir formation immediately adjacent to the wellbore to approximate the saturations prevailing a considerable distance from the wellbore in the reservoir rock. Thus, the relative fluid content of the formation of the reservoir rock adjacent to the wellbore approaches the steady state condition which exists in most of the reservoir.

In this explanation of the invention and particularly Steps II–IV, it will be first assumed that no gas saturation exists in the rock pore space.

Step II: Pulsed neutron device is run into the wellbore to obtain a base log thereby obtaining term $\Sigma_t$. The salinity of the water in the formation must be known, which is readily determined from a sample of the produced formation water. However, if the field or reservoir has been waterflooded to a residual oil saturation with the water of a different salinity from that originally in the formation, Step II should be preceded by injecting a salt water of known salinity into the zone of interest to miscibly displace all the formation water of unknown salinity. Typically, this salt water of known salinity is a sodium chloride solution. However, if the formation being logged is shale and/or clay sensitive, the method of this invention includes injecting into the formation a solution containing at least 100,000 ppm of potassium chloride prior to running the log of Step II.

Step III: Typically the formation is prepared by injecting fresh water having substantially the same thermal neutron capture cross section as the formation hydrocarbon. The injected fresh water miscibly displaces the formation water of known salinity or the injected salt water. If there is danger of causing permeability impairment to the treated region such as clay dispersion and shale sloughing, the formations are termed as fresh water sensitive. It is known that water which contains sodium chloride of sufficient concentrations can be used for injection in such formations and high clay impairment will be prevented. However, the sodium chloride solutions have only limited effect on preventing sloughing of shale. Further, the neutron capture cross section of the sodium chloride solutions is considerably different from the fresh water necessary for displacement of the formation water or the injected salt water. The chloride has a great neutron adsorbtivity. A sodium chloride solution of 50,000 ppm sufficient to prevent clay impairment has a thermal neutron capture cross section of 39.7 s.u. (Sigma Unit) which is almost double that of water which has a cross section of 22.2 s.u. A Sigma Unit is $10^{21}$ barn per cm$^3$. A barn is $10^{-34}$ cm$^2$.

In the method of this invention, an aqueous salt solution in injected into the formation in place of fresh water, the salt of the solution being at least 1000 ppm and a monovalent salt whose cation is selected from a group consisting of potassium and ammonium and whose anion has no constituents having a thermal neutron capture cross section greater than about $0.6 \times 10^{-24}$ cm$^2$. The salt is sufficiently soluble in water to prevent clay and shale damage and to remain economical. The concentration of the salt should range from about 1,000 to 100,000 ppm, a range which is sufficient to prevent clay dispersion and shale sloughing. A concentration between about 10,000 and 30,000 ppm is preferred. A more preferred concentration is 25,000 ppm. Suitable anions which are economical include the sulfate radical and the nitrate radical. Potassium nitrate and potassium sulfate are the preferred metallic salts of this invention.

Step IV: Pulsed neutron log was run as detailed in Step II and $\Sigma_{ff}$ is obtained. Although the above description has been given in considerable detail, it is possible to make modifications in the procedure without parting from the spirit or scope of the invention.

The values of the log responses obtained in Steps II and IV which are representative of $\Sigma_t$ and $\Sigma_{ff}$ are used in Equation 1 to obtain oil saturation.

Each of these logs can be run a number of times and the responses averaged thereby cancelling the effects of any statistical variation in the response which may occur. The average capture cross section is determined for each interval of interest and the oil saturation for that interval is determined.

In order to evaluate fluid compositions under controlled conditions, a series of tests were run to simulate the chemical and mechanical effects of fluid injections on a Fuson shale. In these tests, ASTM plus 10, minus 4 mesh screened samples of Fuson shale were subjected to 16 hours of mechanical agitation (rolling) in an aqueous salt solution having a salt concentration of 15#/bbl. The shale was then filtered onto an ASTM 30 mesh screen and weighted to determine the percentage which remained. This remainder was then agitated in fresh water for 2 hours and again filtered and weighed to determine the amount still remaining. The first portion of this procedure provides a measure of the chemical and mechanical properties of the shale as stabilized by the individual fluids. The fresh water portion of the test provides a measure of the degree to which the shale is stabilized sufficiently such that a logging technique may be performed on the formation. Table I below shows the composition in weight percent of Fuson shale which is used in the tests.

TABLE I

| Shale Composition | Fuson |
|---|---|
| Quartz | 44% |
| Feldspar | trace |
| Gypsum | 1 |
| Montmorillonite | 55 |

Table II shows the mechanical stability imparted to Fuson shale by several inorganic salt solution fluids. The results are the weights of shale retained on the screen after a 16 hour test and then after the additional 2 hour test as percentages of the original weights of shale tested. Ideally, of course, the recovery should be 100%. Comparison of actual injection results with such tests has indicated that recovery values over 85% are excellent, 70% to 85% is good, 55% to 70% is somewhat effective (fair), and under 55% is questionable in terms of whether the treatment would be effective in the field.

TABLE II

| | Shale Recovery | |
|---|---|---|
| Salt | 16 hr wt. % | 2 hr Tap Water wt. % |
| None | 45.2 | 25.6 |
| Sodium Chloride | 66.2 | 29.6 |
| Calcium Chloride | 68.6 | 55.4 |
| Magnesium Chloride | 66.6 | 30.8 |
| Potassium Chloride | 73.4 | 69.8 |
| Ammonium Sulfate | 69.4 | 66.6 |
| Diammonium Phosphate | 70.0 | 67.4 |
| Synthetic Sea Water | 71.2 | 26.2 |
| Sat'd. Sodium Chloride | 75.2 | 25.8 |

It can be seen from Table II that all salts are somewhat effective when subjected to the salt solution (15#/bbl) after the treatment; however, only potassium chloride, ammonium sulfate, and di-ammonium phosphate remain effective in fresh water after the treatment.

Although the above tests were run using potassium chloride which is not useful as a fresh water substitute in the log inject log technique, the results do show the improvement of use of a potassium or ammonium cation over use of either a divalent metallic cation or a sodium cation.

An additional advantage of the method of invention is the compatibility of the injection solution with the polymeric solution typically used in enhanced oil recovery methods. Specifically, flooding agents used in recovery methods are precipitated by divalent salt solutions but not by the salt solutions of the present invention.

Although the above description has been given in considerable detail, it is possible to make modifications in the procedure without departing from the spirit or the scope of the invention.

We claim:

1. A method for minimizing shale and clay damage to a subsurface zone during a log-inject-log procedure of said zone, said zone containing oil and water and being penetrated by a wellbore, comprising:
    (a) conditioning said zone so that the fluid content in said zone adjacent to said wellbore is approximately the same as that present in the zone remote from said wellbore,
    (b) running a pulsed neutron log,
    (c) injecting an aqueous salt solution into said zone from said wellbore, said salt comprising at least 1000 ppm of said solution, whose cation is selected from a group consisting of potassium and ammonium and whose anion has no constituents having a thermal neutron capture cross section more than about $0.6 \times 10^{-24}$ cm$^2$, and
    (d) running a pulsed neutron log.

2. A method for minimizing shale and clay damage to a subsurface zone during a log-inject-log procedure of said zone, said zone containing oil and water and being penetrated by a wellbore, comprising:
    (a) running a pulsed neutron log,
    (b) injecting an aqueous salt solution into said zone from said wellbore, said salt comprising at least 1000 ppm of said solution, whose cation is selected from a group consisting of potassium and ammonium and whose anion has no constituents having a thermal neutron capture cross section more than about $0.6 \times 10^{-24}$ cm$^2$, and
    (c) running a pulsed neutron log.

3. The method of claims 1 or 2 wherein said cation is potassium.

4. The method of claims 1 or 2 wherein said salt is potassium sulfate.

5. The method of claim 3 wherein said salt is potassium nitrate.

6. A method of minimizing shale and clay damage to a subsurface zone during a logging procedure of said zone, said zone containing oil and water and being penetrated by a wellbore, said water being of an unknown salinity or of mixed salinity, comprising:
    (a) injecting a first aqueous salt solution of known salinity and containing a first salt into said zone from the wellbore,
    (b) running a pulsed neutron log,
    (c) injecting a second aqueous salt solution containing a second salt into said zone from the wellbore, said second salt comprising at least 3000 ppm of said second solution, whose cation is selected from a group consisting of potassium and ammonium, and whose anion has no constituents having a thermal neutron capture cross section more than about $0.6 \times 10^{-24}$ cm$^2$ and
    (d) running a pulsed neutron log.

7. The method of claim 6 wherein said second salt is potassium nitrate.

8. The method of claim 6 wherein said second salt is potassium sulfate.

9. The method of claim 6 wherein said first salt is potassium chloride and comprises at least 100,000 ppm of said first solution.

* * * * *